__United States Patent__ [19]

Aitken

[11] Patent Number: 4,784,976

[45] Date of Patent: Nov. 15, 1988

[54] GLASS-CERAMICS CONTAINING NZP-TYPE CRYSTALS

[75] Inventor: Bruce G. Aitken, Painted Post, N.Y.

[73] Assignee: Corning Glass Works, Corning, N.Y.

[21] Appl. No.: 126,182

[22] Filed: Nov. 27, 1987

[51] Int. Cl.$^4$ ............................................. C03C 10/02
[52] U.S. Cl. ........................................... 501/10; 501/4
[58] Field of Search ..................................... 501/10, 4

[56] References Cited

U.S. PATENT DOCUMENTS 3,881,945  5/1975  Trojer et al. ........................... 501/10
4,698,318  10/1987  Vogel et al. ........................... 501/10

FOREIGN PATENT DOCUMENTS 246288  6/1987  German Democratic Rep. .

Primary Examiner—Mark L. Bell
Attorney, Agent, or Firm—Clinton S. Janes, Jr.

[57] ABSTRACT

This invention is directed to the production of glass-ceramic articles wherein a NZP-type crystals constitutes essentially the sole crystal phase. The inventive articles are prepared by heat treating precursor glass articles with compositions having the stoichiometry characterized by the formula $A_{0.4}B_2(XO_4)_3$ wherein A represents at least one monovalent or divalent cation selected from the group consisting of Zn, Mg, Mn, Fe, Co, Ni, Cu, Ca, Cd, Sr, Ba, Tb, Li, Na, and K, B represents at least one trivalent, tetravalent, or pentavalent cation selected from the group consisting of Fe, Ti, Cr, Zr, Nb, Mo, In, Sn, Y, and a RE, and X represents P cations which may be partially replaced by Si cations, and the cation ratio B:X is essentially 2:3.

2 Claims, No Drawings

GLASS-CERAMICS CONTAINING NZP-TYPE CRYSTALS

BACKGROUND OF THE INVENTION

Whereas the abbreviation NZP was originally derived from $NaZr_2(PO_4)_3$, it has now been formulated as a generic term to refer to not only $NaZr_2(PO_4)_3$, but also to related isostructural phosphates and silicophosphates having a similar crystal structure. Stated in another way, NZP refers to the particular crystal structure exemplified by $NaZr_2(PO_4)_3$, not merely to the composition thereof.

NZP materials have been commended for a great variety of applications involving thermal shock resistance and/or low thermal expansion and/or high ionic conductivity and/or the capability of enveloping radiogenic isotopes. Hence, previous studies have indicated that NZP materials are characterized by: (1) a wide range in coefficients of thermal expansion; (2) the presence of superionic conductivity in certain compositions containing alkali metals; and (3) the capability of structurally incorporating particular radionuclides such as $^{127}Cs$ and $^{90}Sr$. Those prior studies have been dealt solely with single crystals and polycrystalline ceramics. No definitive study of compositionally similar glasses and, by extension, glass-ceramics has been reported, probably because of the very low solubility of $ZrO_2$ in phosphate-based glasses. However, because of the recognized unique properties exhibited by NZP materials, the primary objective of the instant invention was to develop glass-ceramic bodies containing NZP-type crystals as the predominant and, preferably, the sole crystal phase.

SUMMARY OF THE INVENTION

Glass-ceramics are prepared by the controlled heat treatment of precursor glass bodies. Hence, the production of glass-ceramic articles customarily contemplates three general steps. First, a glass forming batch, frequently including a nucleating agent, is melted. Second, that melt is cooled to a temperature at least below the transformation range thereof and simultaneously a glass article of a desired configuration is shaped therefrom. Third, that glass article is heated to a temperature above the transformation range for a time sufficient to generate the growth of crystals in situ. To insure the development of uniformly-sized, fine-grained crystallization, the third step is often divided into two stages: (a) the glass body is initially heated to a temperature within or slightly above the transformation range for a period of time sufficient to generate nuclei within the glass; and (b) the nucleated body is thereafter heated to a higher temperature, i.e., approaching or even exceeding the softening point of the glass for a period of time sufficient to cause the growth of crystals on those nuclei. (As employed herein, the transformation range is deemed to represent the temperature at which a molten mass becomes an amorphous solid; that temperature generally being considered as residing in the vicinity of the annealing point of a glass.)

It is well recognized that, as a glass article is heated to a temperature above its transformation range, the viscosity of the glass is increasingly reduced such that the article becomes susceptible to thermal deformation. The extent of the deformation self-evidently becomes more pronounced as the temperature approaches and exceeds the softening point of the glass.

The crystals generated in a glass-ceramic body exhibit a melting point higher than the softening point of the precursor glass. Accordingly, heat treatment of the parent glass body is controlled such that, as the glass is heated above its transformation range, crystal growth occurs sufficiently rapidly to provide an adequate internal structure to support the body, thereby minimizing thermal deformation. Furthermore, as crystallization occurs, the composition of the glass remaining in the body continually changes as its components become integral parts of the crystals. Typically, the viscosity of the residual glass is greater than that of the parent glass, i.e., its transformation range is higher than that of the precursor glass. Nevertheless, thermal deformation is an ever present concern. Moreover, the in situ crystallization of a glass body proceeds more rapidly and to a greater extent when the temperature is raised into the region of the softening point of the parent glass. Consequently, in the interest of speed and economy, the temperature of crystallization will be raised as rapidly as possible to a temperature as high as possible. That practice quite obviously increases the risk of thermal deformation of the precursor glass body. The use of the above-described, two-stage heat treatment also helps in alleviating the problem of thermal deformation, since the nucleating step allows more rapid crystal growth as the body is heated to a higher temperature in the crystallization step.

The NZP stoichiometry can be generalized by the formula $A_{0-4}B_2(XO_4)_3$, wherein A represents a relatively large monovalent or divalent cation, B designates a medium-sized (octahedrally-coordinated) trivalent, tetravalent, or pentavalent cation, and X denotes a small (tetrahedrally-coordinated) tetravalent, pentavalent, or hexavalent cation. The NZP stoichiometry requires the cation ratio B:X to be essentially 2:3. The number of A atoms can range from none up to 4; the number being dependent upon the net charge of the B and X cations.

The better glass forming compositions generally contain no more than a total of two monovalent and/or divalent cations in the A site; the use of greater numbers results in a higher proportion of network modifiers, i.e., A and B cations, to network formers, i.e., X cations, which leads to glass instability. Hence, certain melts of the latter compositions may require very rapid cooling (quenching) to avoid devitrification in the glass body. Nevertheless, in like manner to the better glass forming compositions, the glass bodies resulting from quenching compositions containing more than two cations in the A site can be heat treated to yield articles containing uniformly-sized, fine-grained NZP-type crystals as the predominant crystal phase. The most preferred compositions will contain no more than one cation in the A site.

The initial laboratory work involved the preparation of glass-ceramic bodies from $TiO_2$-nucleated, iron phosphate glasses. Those articles consisted of a fine-grained internally-nucleated intergrowth of $\alpha$-$FePO_4$ and a mixed valence FeTi phosphate, viz., $Fe^{+2}Fe^{+3}Ti(PO_4)_3$, the latter crystals having the NZP structure. Those glass-ceramics were produced by heat treating precursor glass bodies at temperatures between 625°–1000° C. Where the $TiO_2$ content was less than 10% by weight and the heat treatment conducted at temperatures below 800° C., NZP-type crystals constituted the predominant crystal phase. In compositions containing more than 10% $TiO_2$, NZP-type crystals comprised the predominant phase at all heat treating temperatures.

Subsequently, a number of glasses were formulated which were calculated to have the NZP stoichiometry in order to form a glass-ceramic containing NZP as the only crystalline phase and/or reduce the amount of residual glass. One especially desirable glass was one having the stoichiometry of $ZnFeTi(PO_4)_3$. A glass of good melting and forming characteristics was prepared by melting a predried mixture of ZnO, $Fe_2O_3$, $TiO_2$, and $H_3PO_4$ in the proper proportions at 1200° C. in silica crucibles. After annealing at 500° C., the glass body was nucleated by heating slowly, i.e., at about 50° C./hour, to 550° C., and then crystallized in situ by heating at 800° C. for two hours. The resulting product was a homogeneous, uniformly very fine-grained, internally-nucleated glass-ceramic. X-ray diffraction analyses of the product indicated NZP-type crystals constituted the sole crystal phase, with $ZN^{+2}$ ions occupying the A sites and $Fe^{+3}$ and $Ti^{+4}$ ions occupying the B sites.

Because of its excellent glass stability and its inherent capability of being readily crystallized in situ to uniformly fine-grained glass-ceramics, $ZnFeTi(PO_4)_3$ was utilized as a base composition and the following partial and sometimes complete ion substitutions were made therein:

Zn=Mg, Mn, Fe, Co, Ni, Cu, Ca, Cd, Sr, Ba, Pb, Li, Na, K Fe/Ti=Cr, Zr, Nb, Mo, In, Sn, Y, RE (Rare Earth Metals) P=Si As is apparent from the above, nearly all of the stable metallic elements, except for the noble metals, can be incorporated into the NZP structure; thus illustrating the extraordinary flexibility of the NZP structure.

Linear coefficients of thermal expansion (25°-300° C.) have been measured on the inventive glass-ceramic articles varying over the range of about $-20$ to $+65 \times 10^{-7}/°C$. The crystallized bodies have exhibited exceptional chemical durability for phosphate-based materials. That is, although demonstrating slight solubility in HCl, they exhibit virtually no weight loss when immersed in water or alkaline solutions. That chemical resistance is in marked contrast to most phosphate-based glasses and glass-ceramics which demonstrate poor resistance to weathering and, in some instances, are actually hygroscopic.

One especially desirable group of glass-ceramic bodies exhibiting low coefficients of thermal expansion and having the NZP stoichiometry has been prepared, wherein $Nb_2O_5$ comprises one of the components. Hence, utilizing the formula $Zn_{(2x+y-1)/2}(Fe_xTi_yNb_{2-x-y})(PO_4)_3$ as a model system, variations in the amount of Fe, Ti, and Nb in the six-coordinated B site exert a powerful effect upon the thermal expansion of the resultant glass-ceramic. For example, the glass-ceramic containing crystals of $Zn_{0.5}Ti_2(PO_4)_3$ as essentially the sole crystal phase demonstrates a linear coefficient of expansion (25°-300° C.) of $60 \times 10^{-7}/°C$. When one-half of the Ti is replaced with Fe, giving crystals of $ZnFeTi(PO_4)_3$ as essentially the sole crystal phase, the linear coefficient of thermal expansion (25°-300° C.) is reduced to $38 \times 10^{-7}/°C$. Finally, when all of the Ti is replaced with a combination of Fe and Nb to yield crystals of $Zn_{0.5}FeNb(PO_4)_3$, the linear coefficient of thermal expansion of the resultant glass-ceramic was measured at $-11 \times 10^{-7}/°C$. As is evident from the absence of $TiO_2$, those compositions are self-nucleating. The crystals in the final product are somewhat coarser-grained than present in the $TiO_2$-nucleated articles, however.

In summary, glass-ceramic bodies having compositions containing roughly equivalent amounts ($\pm 10\%$ by weight) of Fe, Ti, and Nb exhibit low positive linear coefficients of thermal expansion, viz., about $15-30 \times 10^{-7}/°C$. The glass-ceramic bodies are typically very fine-grained. It was found that Zn could be partially replaced by relatively large cations, such as Ca and Cd without significantly increasing the coefficient of thermal expansion of the glass-ceramic. In contrast, glass-ceramic bodies demonstrating negative coefficients of thermal expansion are formed from compositions wherein Nb constitutes more than 40% of the B sites. The resultant glass-ceramics appear to be slightly porous and the crystals present therein are somewhat coarser-grained.

DESCRIPTION OF PREFERRED EMBODIMENTS

Table I below records a number of glass forming compositions, expressed in terms of parts by weight on the oxide basis, illustrating the products of the invention. Inasmuch as the sum of the individual components totals or closely approximately totals 100, for all practical purposes the values reported in Table I may be deemed to reflect weight percent. The actual batch ingredients may comprise any materials, either oxides or other compounds, which, when melted together, will be converted into the desired oxide in the proper proportions. For example, $H_3PO_4$ may be utilized as the source of $P_2O_5$.

The batch ingredients are compounded, tumble milled together to assist in securing a homogeneous melt, and then charged into silica crucibles. After placing lids thereon, the crucibles were introduced into a gas-fired furnace operating at 1500° C. and the batches were melted for 2 hours. Thereafter, the melts were poured into steel molds to yield glass slabs having dimensions of about $6'' \times 6'' \times 0.5''$ and those slabs were immediately transferred to an annealer operating at about 500° C.

Whereas the above description involved laboratory work, it will be appreciated that the compositions recited in Table I can be melted and formed employing standard commercial glass making equipment.

TABLE I

|  | 1 | 2 | 3 | 4 | 5 | 6 |
|---|---|---|---|---|---|---|
| ZnO | 8.7 | 7.2 | 4.6 | 9.1 | 9.0 | 2.7 |
| $Fe_2O_3$ | 17.1 | 12.3 | 7.3 | 10.8 | 12.4 | 8.9 |
| $TiO_2$ | — | 7.1 | 12.7 | 14.4 | 10.6 | 5.3 |
| $Nb_2O_5$ | 28.5 | 26.4 | 27.1 | 17.9 | 20.6 | 35.6 |
| $P_2O_5$ | 45.6 | 47.0 | 48.3 | 47.8 | 47.2 | 47.5 |

Test samples were cut from the glass slabs and those samples, plus the remainders of the slabs, were moved into an electrically-fired furnace and subjected to the following two-stage heat treatment schedule. The furnace was heated at about 300° C./hour to about 500° C., then heated at about 50° C./hour to about 550° C. to achieve nucleation, thereafter heated at about 300° C./hour to about 800° C., and then held for two hours at that temperature to cause the growth of crystals on the nuclei. The electric current was subsequently cut off and the furnace allowed to cool to room temperature with the samples retained therein. This "cooling at furnace rate" was estimated to average about 200° C./hour.

In like manner to the crucible melting described above, the heat treatment practice related above reflects laboratory activity only. The inventive compositions can be heat treated utilizing equipment commercially employed in the production of glass-ceramic articles.

Table II records the linear coefficient of thermal expansion (Coef. Exp.) over the range of 25°–300° C., expressed in terms of $\times 10^{-7}/°C.$, using measuring techniques conventional in the art, along with a visual description of a fracture surface of the crystalline body.

TABLE II

| Example | Visual Inspection | Coef. Exp. |
|---|---|---|
| 1 | Fine-grained, sandy, slightly porous | −11.1 |
| 2 | Fine-grained, sandy | −18.7 |
| 3 | Fine-grained, sandy | −9.8 |
| 4 | Very fine-grained, cherty | 25.2 |
| 5 | Very fine-grained, cherty | 23.0 |
| 6 | Medium fine-grained, sandy, very slightly porous | 17.3 |

Table III reports a group of glass-forming compositions, expressed in terms of parts by weight on the oxide basis, illustrative of the wide range of glasses which, upon heat treatment, will yield a glass-ceramic body containing a NZP-type crystal as essentially the sole crystal phase. Again, the sum of the individual constituents totals or closely approximates 100 such that the number listed in Table III may be considered to reflect weight percent. Glass slabs were prepared from appropriate batches in like manner to the glasses recorded above in Table I.

Example 7 comprised a base glass having a composition essentially constituting the formula $ZnFeTi(PO_4)_3$ and Examples 8–19 present compositions wherein various cations were substituted for Zn, Fe, or P in the base glass. Next to the substituting cation, the ion replaced and the approximate molar percentage of the ion replaced are reported parenthetically.

TABLE III

|  | 7 | 8 | 9 | 10 | 11 |
|---|---|---|---|---|---|
| ZnO | 17.9 | 13.8 | 13.5 | 13.5 | 13.0 |
| $Fe_2O_3$ | 17.6 | 18.0 | 17.7 | 17.7 | 17.2 |
| $TiO_2$ | 17.6 | 18.0 | 17.8 | 17.8 | 17.3 |
| $P_2O_5$ | 46.9 | 48.0 | 47.0 | 47.0 | 45.7 |
| MgO | — | 2.3 (Zn/25) | — | — | — |
| CoO | — | — | 4.1 (Zn/25) | — | — |
| NiO | — | — | — | 4.1 (Zn/25) | — |
| CdO | — | — | — | — | 7.0 (Zn/25) |

|  | 12 | 13 | 14 | 15 | 16 |
|---|---|---|---|---|---|
| ZnO | 13.6 | 13.3 | 12.5 | 12.9 | 13.5 |
| $Fe_2O_3$ | 17.8 | 17.4 | 16.3 | 16.9 | 17.6 |
| $TiO_2$ | 17.8 | 17.4 | 16.3 | 16.9 | 17.6 |
| $P_2O_5$ | 47.6 | 46.3 | 43.5 | 45.1 | 46.9 |
| CaO | 3.1 (Zn/25) | — | — | — | — |
| SrO | — | 5.6 (Zn/25) | — | — | — |
| PbO | — | — | 11.4 (Zn/25) | — | — |
| BaO | — | — | — | 8.1 (Zn/25) | — |
| CuO | — | — | — | — | 4.4 (Zn/25) |

TABLE III-continued

|  | 17 | 18 | 19 |
|---|---|---|---|
| ZnO | 18.0 | 17.4 | 18.1 |
| $Fe_2O_3$ | 14.0 | 12.8 | 8.9 |
| $TiO_2$ | 17.7 | 17.0 | 26.7 |
| $P_2O_5$ | 47.0 | 45.4 | 39.6 |
| $Cr_2O_3$ | 3.4 (Fe/20) | — | — |
| $In_2O_3$ | — | 7.4 (Fe/25) | — |
| $SiO_2$ | — | — | 6.7 (P/17) |

Test samples were cut from the glass slabs and those samples were heat treated in an electrically-fired furnace in like manner to, and utilizing the same schedule as applied to, the glass slabs of Table I. X-ray diffractometry indicated a high degree of crystallization with a NZP-type crystal constituting essentially the sole crystal phase.

Table IV reports the linear coefficient of thermal expansion (Coef. Exp.) over the range of 25°–300° C. expressed in terms of $\times 10^{-7}/°C.$, along with a visual description of a fracture surface of the crystalline body produced from the compositions of Table III.

TABLE IV

| Example | Coef. Exp. | Visual Description |
|---|---|---|
| 7 | 38 | Very fine-grained, cherty |
| 8 | — | Medium grained, sugary |
| 9 | — | Very fine-grained, cherty |
| 10 | 36.4 | Very fine-grained, cherty |
| 11 | 38.0 | Very fine-grained, cherty |
| 12 | 46.7 | Very fine-grained, cherty-sugary |
| 13 | 60.4 | Very fine-grained, cherty |
| 14 | — | Very fine-grained, cherty, cracked |
| 15 | 39.2 | Very fine-grained, cherty-sugary |
| 16 | — | Very fine-grained, cherty |
| 17 | 38.6 | Very fine-grained, cherty |
| 18 | 50.9 | Fine-grained, cherty-sugary |
| 19 | 46.2 | Medium-fine grained, sugary, slightly porous |

Table V recites another group of glass-forming compositions, expressed in terms of parts by weight on the oxide basis, illustrative of the wide range of glasses which, upon heat treatment, will yield a glass-ceramic body containing a NZP-type crystal as essentially the sole crystal phase. Again, because the sum of the individual constituents totals or closely approximates 100, the figures recorded in Table V may be deemed to represent weight percent. Glass slabs were prepared from appropriate batches in like manner to the glasses reported above in Table I.

Example 20 comprised a base glass having a composition essentially complying with the formula $Zn_{0.5}(Fe_{0.7}Ti_{0.6}Nb_{0.7})(PO_4)_3$ and Examples 21–36 include compositions wherein various cations were substituted for Zn, Fe or Ti in the base glass. Next to the substituting cation, the ion replaced and the approximate molar percentage of the ion replaced are reported parenthetically.

TABLE V

|  | 20 | 21 | 22 | 23 | 24 | 25 |
|---|---|---|---|---|---|---|
| ZnO | 9.0 | 6.8 | 6.8 | 6.8 | 6.8 | 6.8 |
| $Fe_2O_3$ | 12.4 | 12.5 | 12.4 | 12.4 | 12.4 | 14.6 |

TABLE V-continued

|  |  |  |  |  |  | (Zn/25) |
|---|---|---|---|---|---|---|
| TiO$_2$ | 10.6 | 10.8 | 10.7 | 10.6 | 10.6 | 10.6 |
| Nb$_2$O$_5$ | 20.7 | 20.9 | 20.7 | 20.7 | 20.7 | 20.7 |
| P$_2$O$_5$ | 47.2 | 47.8 | 47.3 | 47.3 | 47.3 | 47.3 |
| MgO | — | 1.1 (Zn/25) | — | — | — | — |
| NiO | — | — | 2.1 (Zn/25) | — | — | — |
| CoO | — | — | — | 2.2 (Zn/25) | — | — |
| CuO | — | — | — | — | 2.2 (Zn/25) | — |

|  | 26 | 27 | 28 | 29 | 30 |
|---|---|---|---|---|---|
| ZnO | 6.8 | 6.7 | 6.8 | 6.6 | 6.7 |
| Fe$_2$O$_3$ | 12.4 | 12.2 | 12.5 | 12.2 | 12.3 |
| TiO$_2$ | 10.6 | 10.5 | 10.7 | 10.4 | 10.6 |
| Nb$_2$O$_5$ | 20.6 | 20.4 | 20.8 | 20.3 | 20.5 |
| P$_2$O$_5$ | 47.2 | 46.6 | 47.6 | 46.4 | 47.0 |
| MnO | 2.4 (Zn/25) | — | — | — | — |
| CdO | — | 3.5 (Zn/25) | — | — | — |
| CaO | — | — | 1.6 (Zn/25) | — | — |
| SnO$_2$ | — | — | — | 4.1 (Zn/25) | — |
| SrO | — | — | — | — | 2.9 (Zn/25) |

|  | 31 | 32 | 33 | 34 | 35 | 36 | 37 |
|---|---|---|---|---|---|---|---|
| ZnO | 6.5 | 6.6 | 6.9 | 6.8 | 6.8 | 8.7 | 6.6 |
| Fe$_2$O$_3$ | 11.9 | 12.2 | 12.6 | 12.5 | 12.4 | 11.9 | 8.6 |
| TiO$_2$ | 10.2 | 10.4 | 10.8 | 10.7 | 10.6 | 6.0 | 10.3 |
| Nb$_2$O$_5$ | 19.9 | 20.2 | 20.9 | 20.8 | 20.6 | 19.9 | 20.1 |
| P$_2$O$_5$ | 45.5 | 46.3 | 47.9 | 47.5 | 47.1 | 45.5 | 45.9 |
| PbO | 6.0 (Zn/25) | — | — | — | — | — | — |
| BaO | — | 4.2 (Zn/25) | — | — | — | — | — |
| Li$_2$O | — | — | 0.8 (Zn/40) | — | — | — | — |
| Na$_2$O | — | — | — | 1.7 (Zn/40) | — | — | — |
| K$_2$O | — | — | — | — | 2.6 (Zn/40) | — | — |
| SnO$_2$ | — | — | — | — | — | 8.1 (Ti/42) | — |
| Yb$_2$O$_3$ | — | — | — | — | — | — | 8.5 (Fe/29) |

In like manner to the Examples reported in Table I, test samples were cut from the glass slabs and those samples were heat treated in an electrically-fired furnace in like manner to, and utilizing the same schedule applied to, the glass slabs of Table I. X-ray diffraction patterns indicated a high degree of crystallization with a NZP-type crystal phase comprising essentially the sole crystal phase.

Table VI recites the linear coefficient of thermal expansion (Coef. Exp.) over the range of 25°–300° C. expressed in terms of ×10$^{-7}$/°C., along with a visual description of a fracture surface of the crystalline body produced from the compositions of Table V.

TABLE VI

| Example | Coef. Exp. | Visual Description |
|---|---|---|
| 20 | 23 | Very fine-grained, cherty |
| 21 | 31.9 | Medium-grained, sugary, slightly porous |
| 22 | 41.7 | Fine-grained, cherty, porous |
| 23 | 46.5 | Medium-grained, sugary, slightly porous |
| 24 | 54.0 | Very fine-grained, cherty, black skin |
| 25 | 40.2 | Very fine-grained, cherty |
| 26 | 26.8 | Medium-grained, sugary, slightly porous |
| 27 | 22.3 | Fine-grained, cherty |
| 28 | 21.3 | Very fine-grained, cherty |
| 29 | 29.8 | Fine-grained, cherty-sugary |
| 30 | 29.1 | Very fine-grained, cherty |
| 31 | 29.2 | Very fine-grained, cherty |
| 32 | 54.1 | Fine-grained, cherty |
| 33 | 54.5 | Very fine-grained, cherty |
| 34 | 32.0 | Very fine-grained, cherty-sugary |
| 35 | 39.0 | Very fine-grained, cherty-sugary |
| 36 | 41.2 | Fine-grained, sugary |
| 37 | — | Fine-grained, sandy, very slightly porous |

In general, the glass-ceramics of the present invention exhibit an outward appearance varying from purple to grayish-brown with a very thin skin ranging from dark purple-brown to purple-black.

I claim:

1. A glass-ceramic article exhibiting a linear coefficient of thermal expansion of about −20 to +65×10$^{-7}$/°C. wherein a crystal having the stoichiometry characterized by the formula A$_{0-4}$B$_2$(XO$_4$)$_3$ constitutes essentially the sole crystal phase, wherein a represents a monovalent or divalent cation selected from the group consisting of Zn, Mg, Mn, Fe, Co, Ni, Cu, Ca, Cd, Sr, Ba, Pb, Li, Na, and K, B represents at least one trivalent, tetravalent, or pentavalent cation selected from the group consisting of Fe, Ti, Cr, Zr, Nb, Mo, In, Sn, Y, and an RE, and X represents P cations which may be partially replaced by Si cations, and the cation ratio B:X is essentially 2:3.

2. A glass-ceramic article according to claim 1 wherein A consists of no more than a total of two monovalent and/or divalent cations.

* * * * *